US008862145B2

(12) United States Patent
Chin et al.

(10) Patent No.: US 8,862,145 B2
(45) Date of Patent: Oct. 14, 2014

(54) METHOD AND APPARATUS TO IMPROVIE IDLE MODE POWER CONSUMPTION IN MULTIPLE USIM CONFIGURATION

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 12/846,546

(22) Filed: Jul. 29, 2010

(65) Prior Publication Data

US 2011/0244880 A1 Oct. 6, 2011

Related U.S. Application Data

(60) Provisional application No. 61/320,951, filed on Apr. 5, 2010.

(51) Int. Cl.
H04W 24/00 (2009.01)
H04W 68/02 (2009.01)
H04W 60/00 (2009.01)
H04W 52/02 (2009.01)
H04W 8/18 (2009.01)
H04W 88/06 (2009.01)

(52) U.S. Cl.
CPC .......... H04W 60/005 (2013.01); H04W 68/025 (2013.01); H04W 8/183 (2013.01); H04W 88/06 (2013.01); H04W 52/0216 (2013.01)
USPC .............. 455/456.1; 455/456.2; 455/458; 370/336; 370/342; 370/338; 370/328

(58) Field of Classification Search
USPC .......... 455/426.1, 426.2, 458, 515, 440, 448, 455/456.1, 456.2, 456.5, 456.6; 370/336, 370/342, 338, 328
See application file for complete search history.

(56) References Cited

U.S. PATENT DOCUMENTS

| 6,397,065 | B1* | 5/2002 | Huusko et al. ............. 455/435.2 |
| 6,999,763 | B2* | 2/2006 | Ramalho et al. ........... 455/435.1 |
| 7,280,820 | B2* | 10/2007 | Ekberg ........................ 455/411 |
| 7,349,697 | B2* | 3/2008 | Onaka et al. ............... 455/435.1 |
| 7,463,881 | B2* | 12/2008 | Harris et al. ................. 455/416 |
| 7,610,054 | B2* | 10/2009 | Hosokawa ................... 455/461 |
| 2004/0127233 | A1* | 7/2004 | Harris et al. ................. 455/458 |
| 2004/0156346 | A1* | 8/2004 | O'Neill ....................... 370/338 |

(Continued)

FOREIGN PATENT DOCUMENTS

| CN | 101217737 A | 7/2008 |
| CN | 101217747 A | 7/2008 |

(Continued)

OTHER PUBLICATIONS

International Search Report and Written Opinion—PCT/US2011/031291, ISA/EPO—Jul. 22, 2011.

(Continued)

*Primary Examiner* — Kent Chang
*Assistant Examiner* — William Lu
(74) *Attorney, Agent, or Firm* — Kristine U. Ekwueme

(57) ABSTRACT

Certain aspects of the present disclosure propose techniques and apparatus for improving idle mode power consumption of a mobile station with multiple Universal Subscriber Identity Modules (USIMs).

24 Claims, 8 Drawing Sheets

(56) References Cited

U.S. PATENT DOCUMENTS

| | | | |
|---|---|---|---|
| 2004/0180676 A1* | 9/2004 | Haumont et al. | 455/461 |
| 2005/0037746 A1 | 2/2005 | Ramalho et al. | |
| 2005/0208965 A1* | 9/2005 | Nakajima | 455/552.1 |
| 2006/0099972 A1* | 5/2006 | Nair et al. | 455/458 |
| 2006/0182069 A1 | 8/2006 | Yu | |
| 2007/0105567 A1* | 5/2007 | Mohanty et al. | 455/458 |
| 2008/0020773 A1* | 1/2008 | Black et al. | 455/445 |
| 2009/0017817 A1* | 1/2009 | Bleckert et al. | 455/433 |
| 2009/0047951 A1* | 2/2009 | Yeoum et al. | 455/435.1 |
| 2009/0059841 A1* | 3/2009 | Laroia et al. | 370/328 |
| 2009/0061932 A1* | 3/2009 | Nagarajan | 455/558 |
| 2009/0093217 A1* | 4/2009 | Shin | 455/67.11 |
| 2009/0131054 A1* | 5/2009 | Zhang | 455/436 |
| 2009/0239582 A1* | 9/2009 | Lin | 455/558 |
| 2010/0120427 A1* | 5/2010 | Guo | 455/435.1 |
| 2010/0203906 A1* | 8/2010 | Fang et al. | 455/458 |
| 2010/0279698 A1* | 11/2010 | Wong | 455/450 |
| 2011/0117962 A1* | 5/2011 | Qiu et al. | 455/558 |
| 2011/0117965 A1* | 5/2011 | Gong et al. | 455/558 |

FOREIGN PATENT DOCUMENTS

| | | |
|---|---|---|
| CN | 101536560 A | 9/2009 |
| GB | 2293946 A | 4/1996 |
| WO | WO0041409 A2 | 7/2000 |

OTHER PUBLICATIONS

Taiwan Search Report—TW100111861—TIPO—Jan. 2, 2014.

* cited by examiner

METHOD AND APPARATUS TO IMPROVIE IDLE MODE POWER CONSUMPTION IN MULTIPLE USIM CONFIGURATION

CLAIM OF PRIORITY UNDER 35 U.S.C. §119

This application claims the benefit of U.S. Provisional Patent Application No. 61/320,951 entitled: "Method and Apparatus to Improve Idle Mode Power Consumption in Multiple USIM Configuration," filed on Apr. 5, 2010, the disclosure of which is expressly incorporated by reference herein in its entirety.

BACKGROUND

1. Field

Aspects of the present disclosure relate generally to wireless communications, and more particularly, to a method and apparatus for improving idle mode power consumption of a mobile station with multiple Universal Subscriber Identity Modules (USIMs).

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

Certain aspects of the present disclosure provide a method of wireless communication. The method generally includes transmitting a network attachment message including at least two Subscriber Identities (SIs).

Certain aspects of the present disclosure provide an apparatus for wireless communication. The apparatus generally includes means for transmitting a network attachment message including at least two Subscriber Identities (SIs).

Certain aspects of the present disclosure provide a computer program product. The computer program product generally includes a computer-readable medium comprising code for transmitting a network attachment message including at least two Subscriber Identities (SIs).

Certain aspects of the present disclosure provide an apparatus for wireless communication. The apparatus generally includes at least one processor, and a memory coupled to the at least one processor, wherein the at least one processor is configured to transmit a network attachment message including at least two Subscriber Identities (SIs).

Certain aspects of the present disclosure provide a method of wireless communication. The method generally includes receiving a network attachment message including at least two Subscriber Identities (SIs).

Certain aspects of the present disclosure provide an apparatus for wireless communication. The apparatus generally includes means for receiving a network attachment message including at least two Subscriber Identities (SIs).

Certain aspects of the present disclosure provide a computer program product. The computer program product generally includes a computer-readable medium comprising code for receiving a network attachment message including at least two Subscriber Identities (SIs).

Certain aspects of the present disclosure provide an apparatus for wireless communication. The apparatus generally includes at least one processor, and a memory coupled to the at least one processor, wherein the at least one processor is configured to receive a network attachment message including at least two Subscriber Identities (SIs).

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
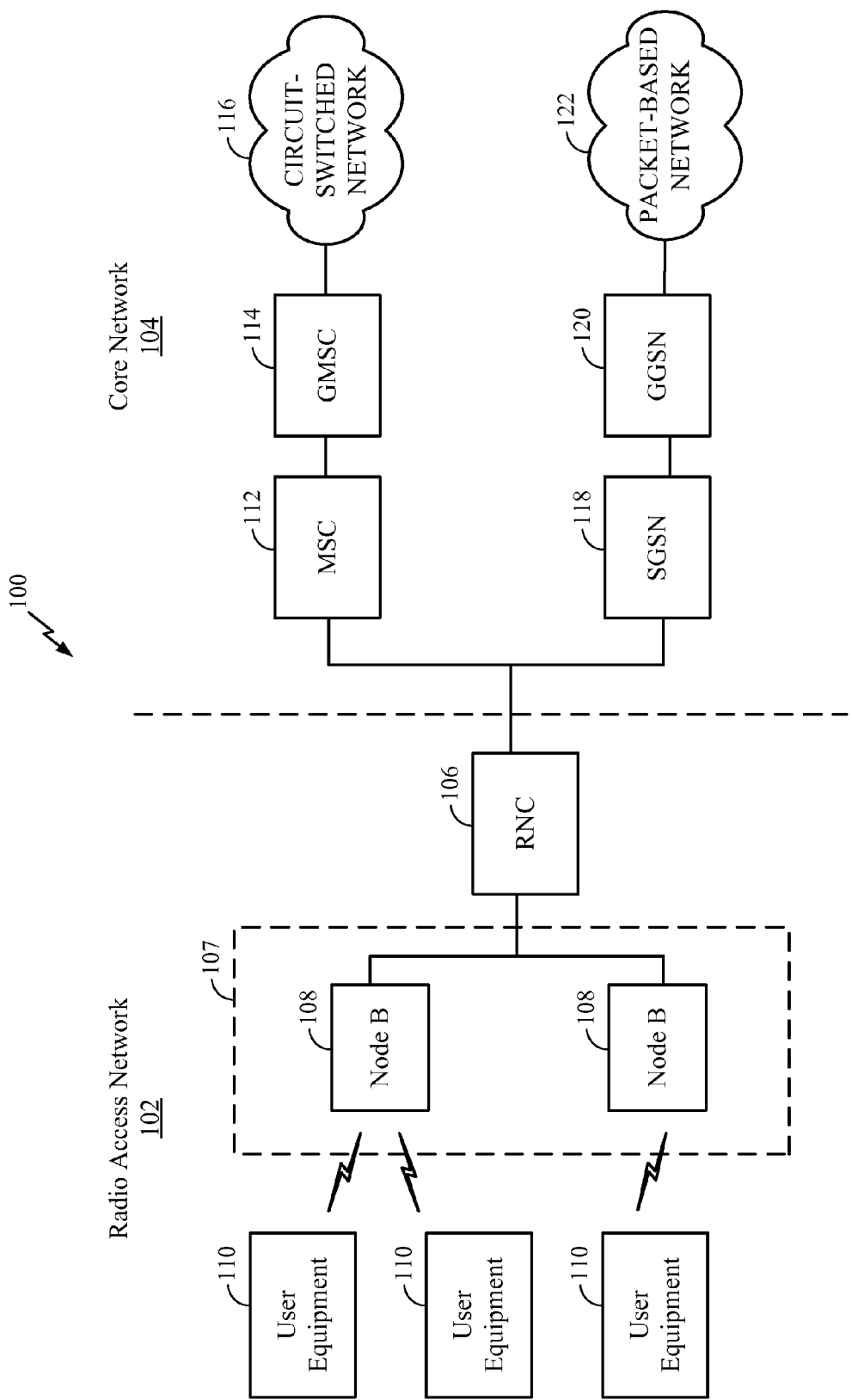
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
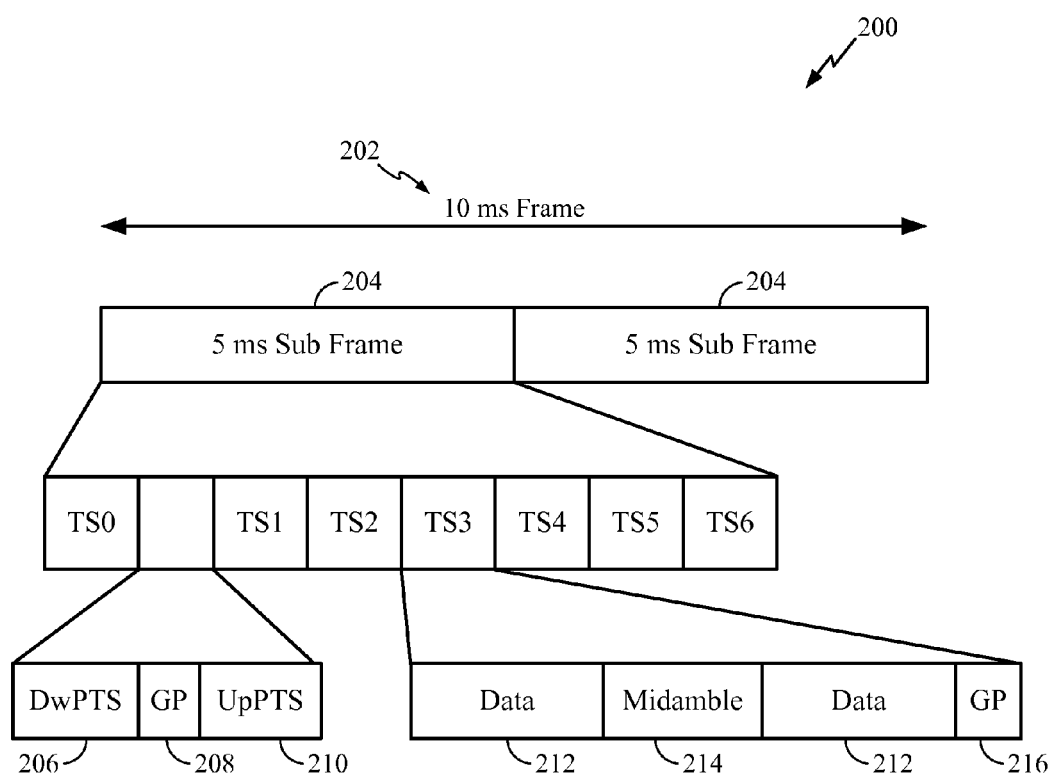
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
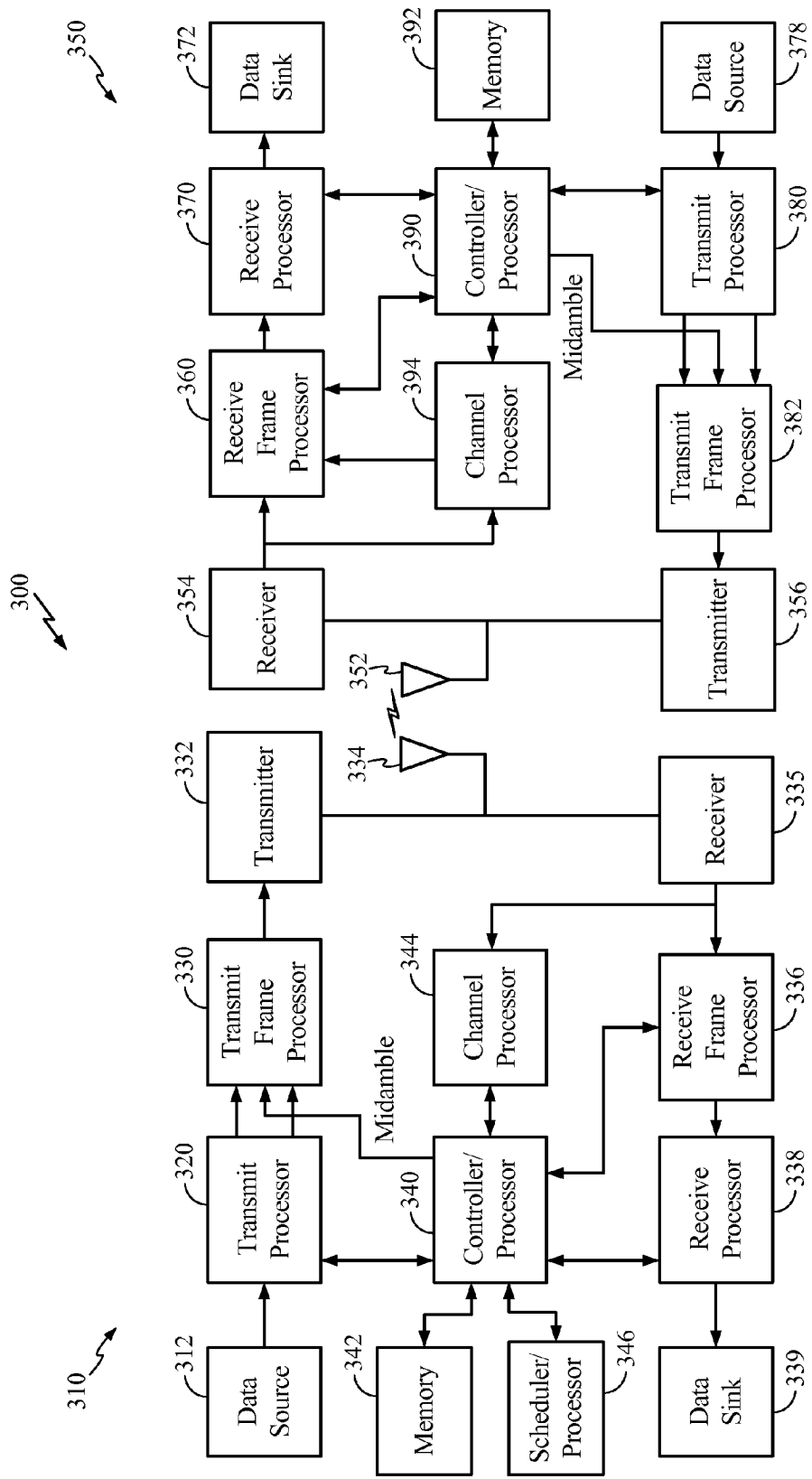
FIG. 3 is a block diagram conceptually illustrating an example of a Node B in communication with a user equipment (UE) in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1 and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

TD-SCDMA User Stations with Multiple Universal Subscriber Identity Modules

It has become increasingly popular that a mobile phone has more than one Universal Subscriber Identity Module (USIM). In this case, a user may make a phone call or receive a phone call in different phone numbers. Each USIM may comprise a unique International Mobile Subscriber Identity (IMSI).

In TD-SCDMA, a user equipment (UE) in the idle mode DRX (Discontinuous Reception) operation may listen to certain recurrent paging blocks with PICH (Paging Indicator Channel). The UE may listen to the PICH starting with the associated paging_occasion_td, as given by:

$$\text{paging\_occasion\_}td = (\text{IMSI div } K)\text{mod}(\text{DRX\_cycle\_}td \text{ div PBP})*\text{PBP} + \text{frame\_offset} + j*\text{DRX\_cycle\_}td + p. \quad (1)$$

Figure 4:
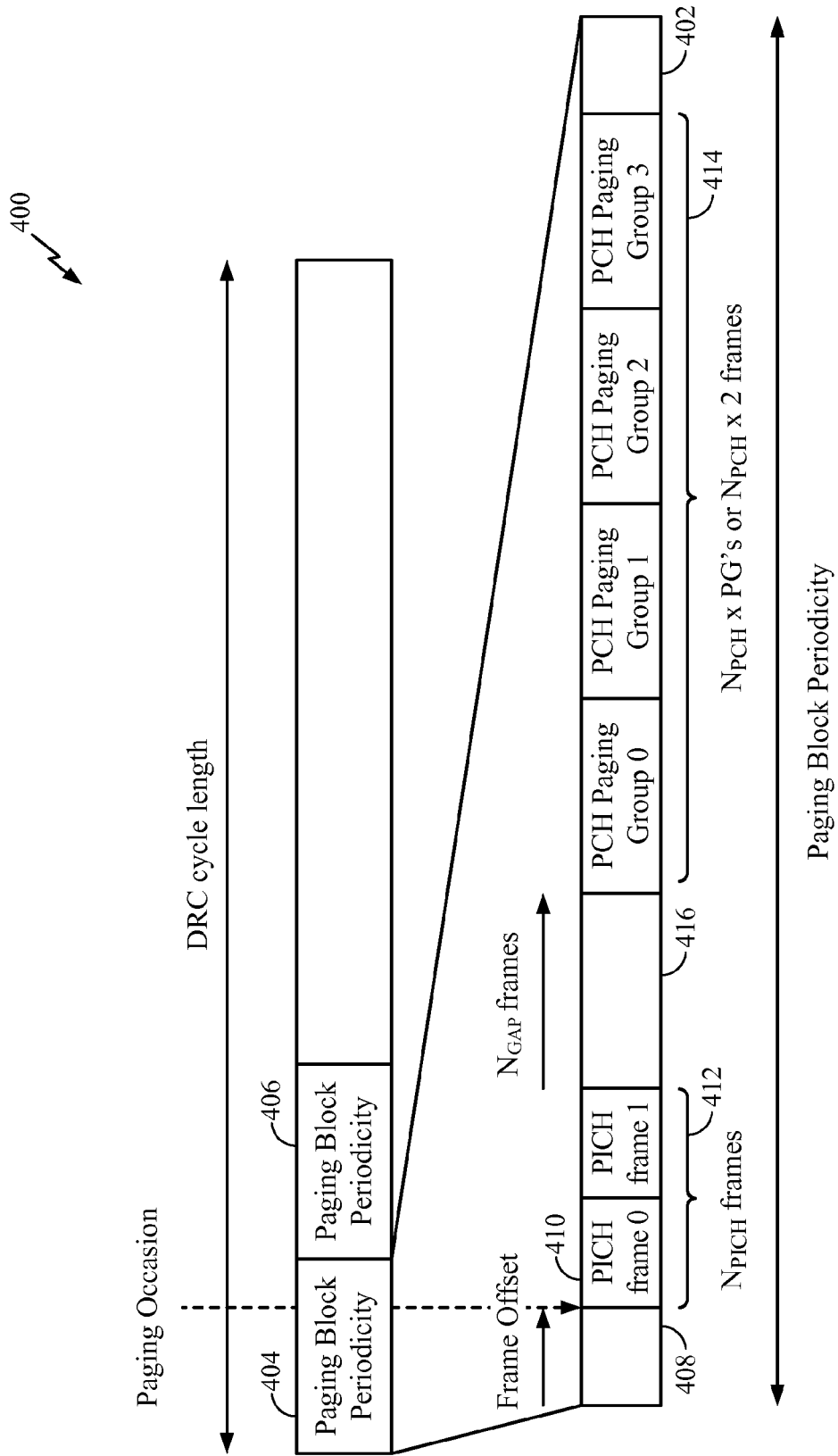
FIG. 4 is a block diagram conceptually illustrating an example of a structure of Time Division-Synchronous Code Division Multiple Access (TD-SCDMA) Paging Indicator Channel (PICH) and Paging Channel (PCH) in accordance with certain aspects of the present disclosure.

FIG. 4 is a block diagram 400 conceptually illustrating an example of a structure of TD-SCDMA PICH and Paging Channel (PCH) in accordance with certain aspects of the present disclosure. The PBP (Paging Block Periodicity) from equation (1) represents a number of frames within a structure 402 between two paging blocks (e.g., paging blocks 404 and 406). The frame offset from equation (1) represents an offset 408 of a first PICH frame 410 in the first paging block 404. The offset 408 may be given in a System Information message. The parameter K from equation (1) represents a number of S-CCPCHs (Secondary Common Control Physical Channels) that can carry PCH.

Per Paging Block Periodicity (PBP), there may be a PICH with $N_{PICH}$ frames 412 and PCH with $N_{PCH} \times 2$ frames 414, as illustrated in FIG. 4. There may be $N_{GAP}$ frames 416 from the end of the PICH frames 412 to the beginning of the PCH frames 414. The UE may be assigned to one of the $N_{PICH}$ frames in the PICH block 412 and to one of $N_{PCH}$ paging groups (each of two frames) in the PCH block 414, which may start from the associated paging occasion. The parameters $N_{PICH}$, $N_{GAP}$, $N_{PCH}$ may be known from the System Information message.

The UE may only need to listen to one specific frame of PICH within the frames 412 by the following formula:

$$p = [(\text{IMSI div } 8192)\text{mod}(N_{PICH} \cdot N_{PI})] \text{ div } N_{PI} \quad (2)$$

where the $N_{PI}$ is a number of paging indicators per frame in the PICH, and this parameter may be derived from the System Information message.

If there is a match with PICH bit, then the UE may subsequently monitor one of the 20 ms PCH Paging Group frames 414. An index of Paging Group may be determined according to:

$$m = [(\text{IMSI div } 8192)\text{mod}(N_{PICH} \cdot N_{PI})] \text{ mod } N_{PCH}. \quad (3)$$

Figure 5:
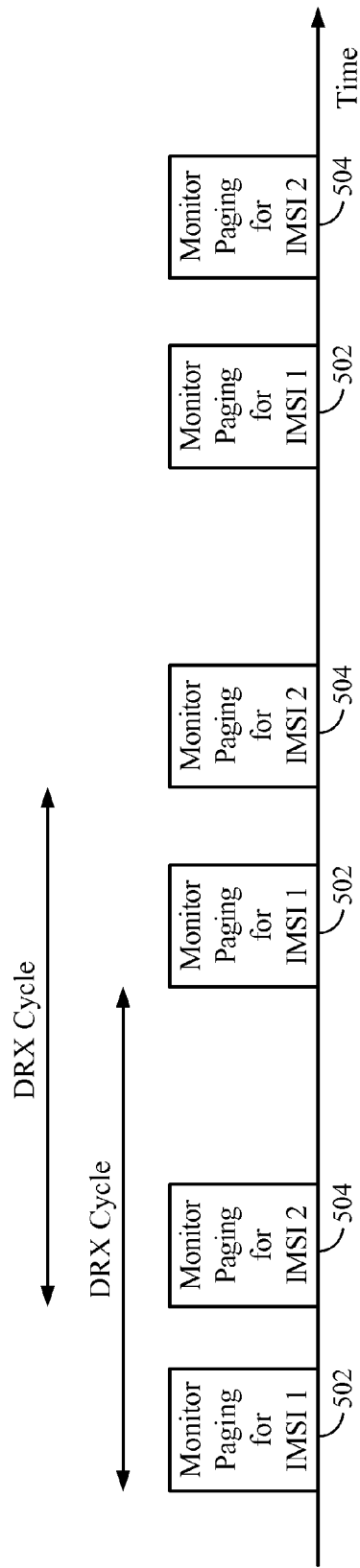
FIG. 5 illustrates an example of monitoring multiple paging messages in accordance with certain aspects of the present disclosure.

The mobile terminal with multiple USIMs and IMSIs may monitor paging messages according to different paging time intervals. This is mainly because the IMSI may affect equations (1), (2), and (3). Accordingly, if, for example, the UE comprises two IMSIs, the UE may need to monitor twice as long time duration as if it comprises only one phone number. Therefore, the power consumption may double. Further, additional procedures may be required for each USIM, such as attaching and location updating. FIG. 5 illustrates an example of monitoring two paging messages 502 and 504 for two IMSIs in each DRX cycle in accordance with certain aspects of the present disclosure.

The present disclosure proposes a solution to decrease the idle mode power consumption of the mobile terminal with multiple USIMs by applying an efficient procedure for the mobile terminal with multiple USIM configuration.

Figure 6:
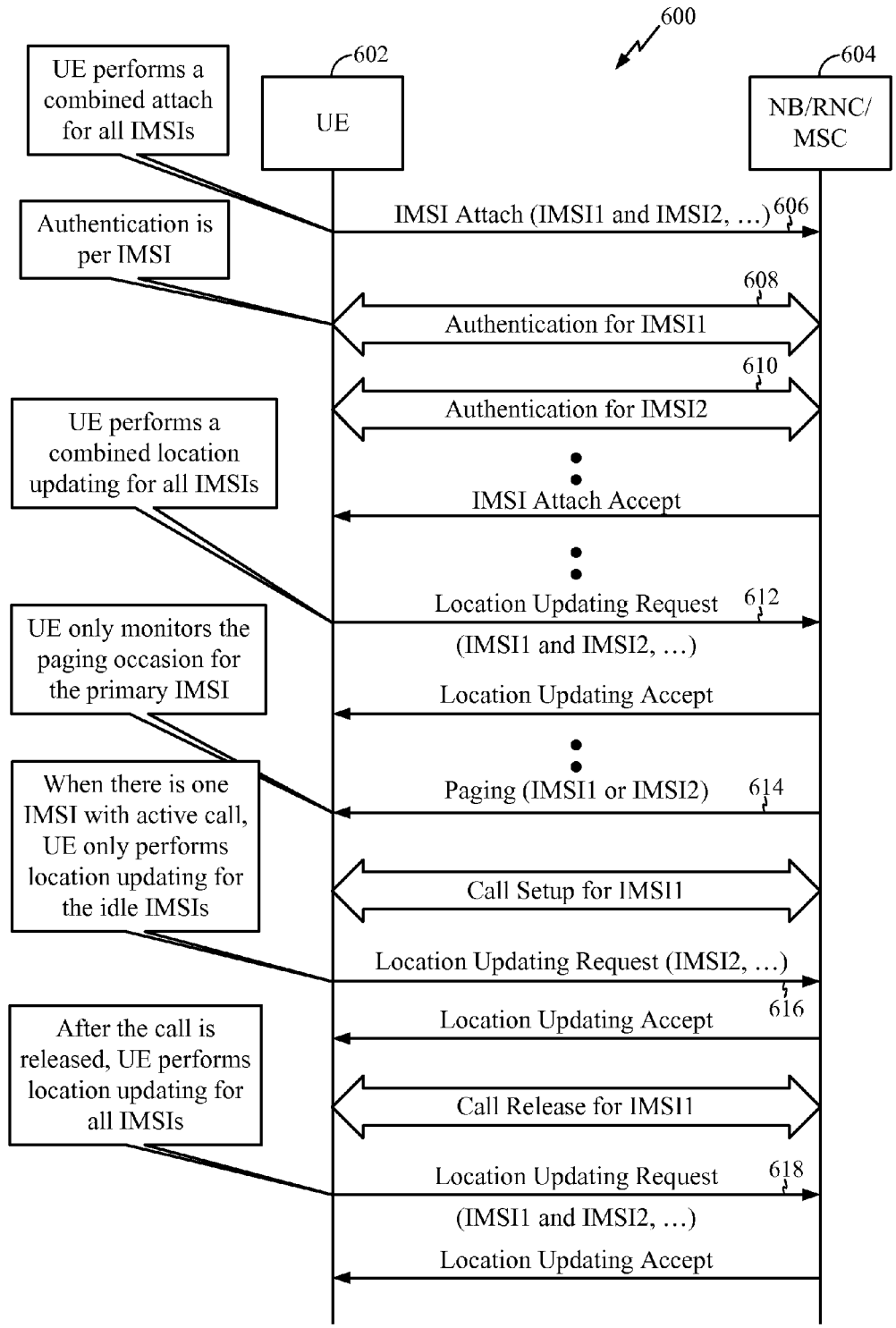
FIG. 6 illustrates an example message sequence between a UE with multiple International Mobile Subscriber Identities (IMSIs) and a serving Node B in accordance with certain aspects of the present disclosure.

Method and Apparatus to Improve Idle Mode Power Consumption in Multiple USIM Configuration Certain aspects of the present disclosure support a multi-USIM mobile phone that may perform a combined IMSI attach to a network with multiple IMSIs and monitor page messages addressed to multiple IMSIs using a single paging occasion. FIG. 6 illustrates an example message sequence 600 between a UE 602 with multiple IMSIs and a Node B (NB)/Radio Network Controller (RNC)/Mobile Switching Center (MSC) 604 in accordance with certain aspects of the present disclosure.

Figure 7:
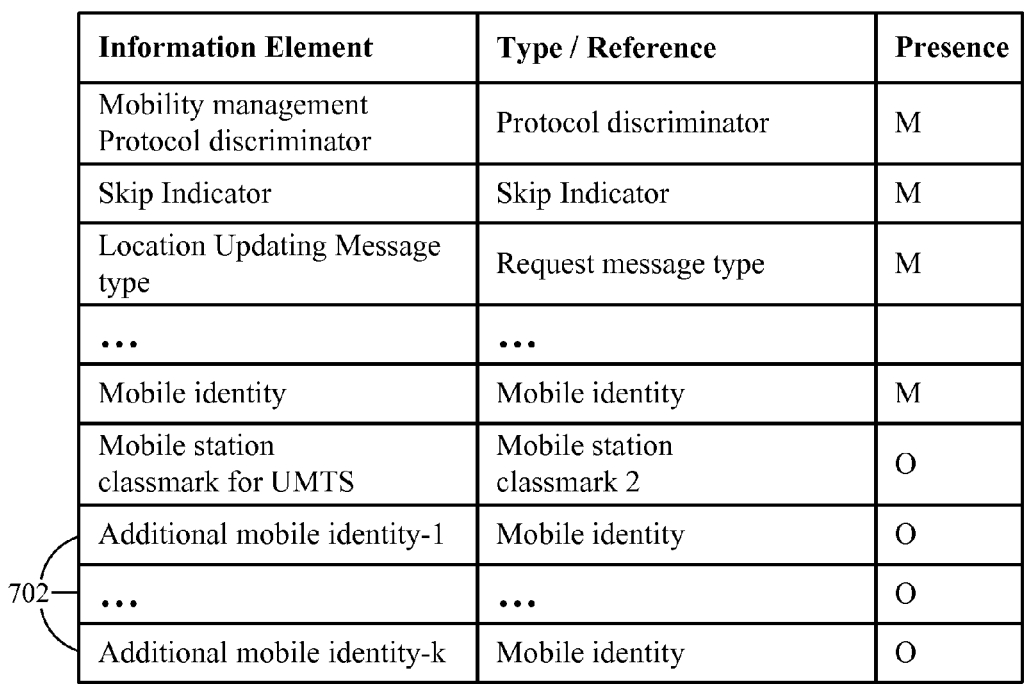
FIG. 7 illustrates an example of modified Location Updating Request message allowing additional mobile identity information in accordance with certain aspects of the present disclosure.

The UE 602 may perform a combined attach 606 for all associated IMSIs using a single Location Updating Request message. In addition, the UE 602 may perform a combined location updating for all IMSIs by using a single Location Updating Request message 612 with multiple IMSIs. As illustrated in FIG. 7, the Location Updating Request message may be revised to allow additional Mobile Identity Information Elements (IEs) 702 to be included in a Location Updating Request message 700.

This updated format of the Location Updating Request message may allow the UE 602 to initiate multiple IMSI attach in one message (e.g., in the message 606 illustrated in FIG. 6). However, the UE 602 may still get an individual authentication for each IMSI (e.g., an authentication 608 for IMSI1 and an authentication 610 for IMSI2, as illustrated in FIG. 6). Subsequently, whenever location updating is required, the UE 602 may also use one single Location Updating Request message to update the location for all IMSIs associated with the UE.

In a paging message 614 received from the NB/RNC/MSC 604, the UE 602 may only monitor a paging occasion for the primary IMSI as defined by the mandatory Mobile Identity IE. The NB/RNC/MSC 604 may transmit, for example, a page message addressing a second IMSI on the paging occasion of the first primary IMSI. The UE 602 may be accessing a paging channel, and then it may identify one of the IMSIs (i.e., the primary IMSI) in that paging channel.

When there is one IMSI with active call (e.g., the IMSI1), the UE 602 may perform location updating only for idle IMSIs, as illustrated in FIG. 6 by sending a Location Updating Request Message 616 without the IMSI1. After the call is being released, the UE 602 may perform location updating for all associated IMSIs by sending another Location Updating Request Message 618 to the NB/RNC/MSC 604.

Figure 8:
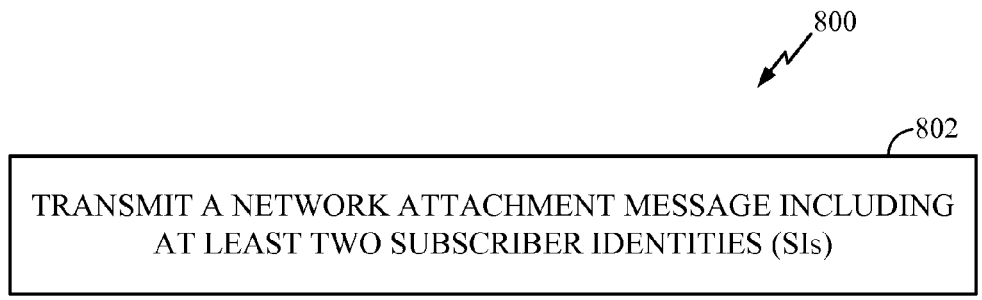
FIG. 8 is a functional block diagram conceptually illustrating example blocks executed at the UE to implement the functional characteristics of one aspect of the present disclosure.

FIG. 8 is a functional block diagram conceptually illustrating example blocks executed at a UE to implement the functional characteristics of one aspect of the present disclosure. Operations illustrated by the block(s) 800 may be executed, for example, by the processors 370 and 380 of the UE 350 from FIG. 3. In block 802, the UE may transmit a network attachment message including at least two Subscriber Identities (SIs).

Figure 9:
FIG. 9 is a functional block diagram conceptually illustrating example blocks executed at the Node B to implement the functional characteristics of one aspect of the present disclosure.

FIG. 9 is a functional block diagram conceptually illustrating example blocks executed at a Node B to implement the functional characteristics of one aspect of the present disclosure. Operations illustrated by the block(s) 900 may be executed, for example, by the processors 320 and 338 of the Node B 310 from FIG. 3. In block 902, the Node B may receive a network attachment message including at least two SIs.

In one configuration, the apparatus 350 for wireless communication includes means for transmitting a network attachment message including at least two SIs. In one aspect, the aforementioned means may be the processors 370 and 380 configured to perform the functions recited by the aforementioned means. In another aspect, the aforementioned means may be a module or any apparatus configured to perform the functions recited by the aforementioned means.

In one configuration, the apparatus 310 for wireless communication includes means for receiving a network attachment message including at least two SIs. In one aspect, the aforementioned means may be the processors 320 and 338 configured to perform the functions recited by the aforementioned means. In another aspect, the aforementioned means may be a module or any apparatus configured to perform the functions recited by the aforementioned means.

The proposed disclosure may allow a mobile terminal with multiple USIMs to reduce its power consumption by using one single paging monitoring schedule. The proposed method may reduce a number of exchanged messages between the mobile terminal and a serving Node B by using the combined attach and location updating procedures.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of a list of" items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   transmitting, from a user equipment (UE) to a network entity, a first single location updating request message including a network attachment message for at least two Subscriber Identities (SIs) associated with the UE, the first single location updating request message configured to include information relating to the at least two SIs;
monitoring, at the UE, a single paging occasion of a first SI of the at least two SIs for a page message addressed to a second SI of the at least two SIs; and
transmitting, from the UE to the network entity, a second single location updating request message for only idle SIs of the at least two SIs when one of the at least two SIs has an active call with the network entity.

2. The method of claim 1, further comprising:
updating location information for the at least two SIs by transmitting a third single location updating request message when the at least two SIs are idle.

3. The method of claim 1, further comprising:
accessing a paging channel; and
identifying one of the SIs in the paging channel.

4. The method of claim 1, further comprising:
obtaining individual authentication for each of the at least two SIs.

5. The method of claim 1, further comprising:
releasing the active call;
performing location updating for the at least two SIs; and
transmitting, to the network entity, a third single location updating request message including updated location information of the at least two SIs.

6. An apparatus for wireless communication, comprising:
means for transmitting, from a user equipment (UE) to a network entity, a first single location updating request message including a network attachment message for at least two Subscriber Identities (SIs) associated with the UE, the first single location updating request message configured to include information relating to the at least two SIs;
means for monitoring, at the UE, a single paging occasion of a first SI of the at least two SIs for a page message addressed to a second SI of the at least two SIs; and
means for transmitting, from the UE to the network entity, a second single location updating request message for only idle SIs of the at least two SIs when one of the at least two SIs has an active call with the network entity.

7. The apparatus of claim 6, further comprising:
means for updating location information for the at least two SIs by transmitting a third single location updating request message when the at least two SIs are idle.

8. The apparatus of claim 6, further comprising:
means for accessing a paging channel; and
means for identifying one of the SIs in the paging channel.

9. A computer program product, comprising a non-transitory computer-readable medium comprising code for:
transmitting, from a user equipment (UE) to a network entity, a first single location updating request message including a network attachment message for at least two Subscriber Identities (SIs) associated with the UE, the first single location updating request message configured to include information relating to the at least two SIs;
monitoring, at the UE, a single paging occasion of a first SI of the at least two SIs for a page message addressed to a second SI of the at least two SIs; and
transmitting, from the UE to the network entity, a second single location updating request message for only idle SIs of the at least two SIs when one of the at least two SIs has an active call with the network entity.

10. The computer program product of claim 9, wherein the computer-readable medium further comprising code for:
updating location information for the at least two SIs by transmitting a third single location updating request message when the at least two SIs are idle.

11. The computer program product of claim 9, wherein the computer-readable medium further comprising code for:
accessing a paging channel; and
identifying one of the SIs in the paging channel.

12. A user equipment for wireless communication, comprising:
at least one processor configured:
to transmit, from the UE to a network entity, a first single location updating request message including a network attachment message for at least two Subscriber Identities (SIs) associated with the UE, the first single location updating request message configured to include information relating to the at least two SI;
to monitor, at the UE, a single paging occasion of a first SI of the at least two SIs for a page message addressed to a second SI of the at least two SIs; and
to transmit, from the UE to the network entity, a second single location updating request message for only idle SIs of the at least two SIs when one of the at least two SIs has an active call with the network entity; and
a memory coupled to the at least one processor.

13. The apparatus of claim 12, wherein the at least one processor is configured to update location information for the at least two SIs by transmitting a third single location updating request message when the at least two SIs are idle.

14. The apparatus of claim 12, wherein the at least one processor is configured to:
access a paging channel; and
identify one of the SIs in the paging channel.

15. A method of wireless communication, comprising:
receiving, at a network entity, a first single location updating request message including a network attachment message for at least two Subscriber Identities (SIs) associated with a user equipment (UE), the single location updating request message configured to include information relating to the at least two SIs; and
transmitting, from the network entity, a page message addressing a first SI of the at least two SIs during a paging occasion for a second SI of the at least two SIs; and
receiving, at the network entity, a second single location updating request message for only idle SIs of the at least two SIs when one of the at least two SIs has an active call with the network entity.

16. The method of claim 15, further comprising:
transmitting a location updating request for updating location information of the at least two SIs; and
receiving a third single location updating request message including the at least two SIs when the at least two SIs are idle.

17. The method of claim 15, further comprising:
individually authenticating each of the at least two SIs.

18. The method of claim 15, further comprising receiving a third single location updating request message configured to include updated location information of the at least two SIs, the third single location updating request message being received after the active call is released and the UE has performed location updating for the at least two SIs.

19. An apparatus for wireless communication, comprising:
means for receiving, at a network entity, a first single location updating request message including a network attachment message for at least two Subscriber Identities (SIs) associated with a user equipment (UE), the single location updating request message configured to include information relating to the at least two SIs; and means for transmitting, from the network entity, a page message addressing a first SI of the at least two SIs during a paging occasion for a second SI of the at least two SIs; and means for receiving, at the network entity, a second single location updating request message for only idle SIs of the at least two SIs when one of the at least two SIs has an active call with the network entity.

20. The apparatus of claim 19, further comprising:

means for transmitting a location updating request for updating location information of the at least two SIs; and means for receiving a third single location updating request message including the at least two SIs when the at least two SIs are idle.

21. A computer program product, comprising a non-transitory computer-readable medium comprising code for:

receiving, at a network entity, a first single location updating request message including a network attachment message for at least two Subscriber Identities (SIs) associated with a user equipment (UE), the single location updating request message configured to include information relating to the at least two SIs; and transmitting, from the network entity, a page message addressing a first SI of the at least two SIs during a paging occasion for a second SI of the at least two SIs; and receiving, at the network entity, a second single location updating request message for only idle SIs of the at least two SIs when one of the at least two SIs has an active call with the network entity.

22. The computer program product of claim 21, wherein the computer-readable medium further comprising code for:

transmitting a location updating request for updating location information of the at least two SIs; and receiving a third single location updating request message including the at least two SIs when the at least two SIs are idle.

23. A network entity for wireless communication, comprising:

at least one processor configured:

to receive, at the network entity, a first single location updating request message including a network attachment message for at least two Subscriber Identities (SIs) associated with a user equipment (UE), the single location updating request message configured to include information relating to the at least two SIs;

to transmit, from the network entity, a page message addressing a first SI of the at least two SIs during a paging occasion for a second SI of the at least two SIs; and to receive, at the network entity, a second single location updating request message for only idle SIs of the at least two SIs when one of the at least two SIs has an active call with the network entity; and a memory coupled to the at least one processor.

24. The apparatus of claim 23, wherein the at least one processor is configured to:

transmit a location updating request for updating location information of the at least two SIs; and receive a third single location updating request message including the at least two SIs when the at least two SIs are idle.

* * * * *